(12) United States Patent
Jeong

(10) Patent No.: US 7,755,002 B2
(45) Date of Patent: Jul. 13, 2010

(54) JIG FOR GRIPPING PANEL

(75) Inventor: Jae-Ho Jeong, Gwangmyeong-si (KR)

(73) Assignee: Kia Motors Corporation, Seoul (KR)

( * ) Notice: Subject to any disclaimer, the term of this patent is extended or adjusted under 35 U.S.C. 154(b) by 868 days.

(21) Appl. No.: 11/646,078

(22) Filed: Dec. 26, 2006

(65) Prior Publication Data

US 2008/0087656 A1      Apr. 17, 2008

(30) Foreign Application Priority Data

Oct. 17, 2006    (KR) .................... 10-2006-0100700

(51) Int. Cl.
*B21J 13/08* (2006.01)
*B23K 9/12* (2006.01)
*B23K 9/28* (2006.01)

(52) U.S. Cl. .................... 219/158; 219/79; 219/86.24; 219/87; 901/42

(58) Field of Classification Search .............. 219/79, 219/80, 86.1, 86.24, 87, 121.82, 158; 248/680; 901/42
See application file for complete search history.

(56) References Cited

U.S. PATENT DOCUMENTS 1,122,665 A * 12/1914 Thomson .................. 219/87

5,400,943 A * 3/1995 Rossi ...................... 228/6.1
2008/0287240 A1 * 11/2008 Hibino et al. .............. 475/11

FOREIGN PATENT DOCUMENTS

| DE | 4203056 A1 * | 8/1993 |
|----|--------------|--------|
| JP | 55157445     | 12/1980 |
| JP | 59007646     | 1/1984 |
| JP | 63143135     | 6/1988 |
| JP | 11188677     | 7/1999 |
| WO | WO 2006104216 A1 * | 10/2006 |

* cited by examiner

*Primary Examiner*—Stephen J Ralis
(74) *Attorney, Agent, or Firm*—Morgan, Lewis & Bockius LLP

(57) ABSTRACT

A panel gripping jig for gripping a panel, regardless of the size and shape of the panel, includes a welding unit for temporarily holding the panel. A separation unit releases the coupling state of the panel and the welding unit. A mounting arm has the welding unit mounted thereon, moves the welding unit in a longitudinal direction thereof, and has a connection part to connect the mounting arm to a working robot. A displacement unit adjusts the position of the welding unit on the mounting arm. A control board outputs control signals to operate the welding unit, the separation unit, and the displacement unit according to a user input.

7 Claims, 4 Drawing Sheets

US 7,755,002 B2

JIG FOR GRIPPING PANEL

CROSS-REFERENCE TO RELATED APPLICATIONS

The present application is based on, and claims priority from, Korean Application Serial Number 10-2006-0100700, filed on Oct. 17, 2006, the disclosure of which is hereby incorporated by reference herein in its entirety.

FIELD OF THE INVENTION

The present invention relates generally to a jig for gripping a panel for moving the panel to a desired place and, more particularly, to a jig for gripping a panel, which is joined to a surface of the panel through spot welding and is separated from a joined portion when necessary, thus enabling the panel to be moved to a desired place.

BACKGROUND OF THE INVENTION

Generally, a vehicle body comprises a BIW (Body In White) which is composed of various panels formed using a press and welded together. The panels include a side panel, a roof panel, a door panel, and a fender panel. The panels go through an automatic loading process prior to being fed to and stored in a palette. Next, the panels are supplied to a welding line and welded by a welding robot, thus forming a finished vehicle body. A working robot transfers the panels from the pressing process to the automatic loading process or the welding process. A jig is mounted to one arm of the working robot for gripping the panels.

The panel gripping jig is typically a vacuum-sucking-type jig or a clamp-type jig. In order to carry various sizes and shapes of panels, various jigs must be provided. Further, a vacuum-sucking-type jig operates smoothly only when the surface of a panel is flat. Meanwhile, a conventional clamp-type jig is problematic in that the panel must be provided with a seating surface for clamping.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a panel gripping jig which can grip a panel regardless of the size, shape, or degree of curvature of the surface of the panel, thus being universally usable for carrying various kinds of panels.

A jig for gripping a panel may include a welding unit for temporarily holding a panel. A separation unit releases the coupling state of the panel and the welding unit. The welding unit is mounted to a mounting arm to move in a longitudinal direction of the mounting arm. The mounting arm has a connection part to connect the mounting arm to a working robot. A displacement unit variably adjusts the position of the welding unit on the mounting arm. A control board outputs control signals to operate the welding unit, the separation unit, and the displacement unit according to a worker's instructions.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
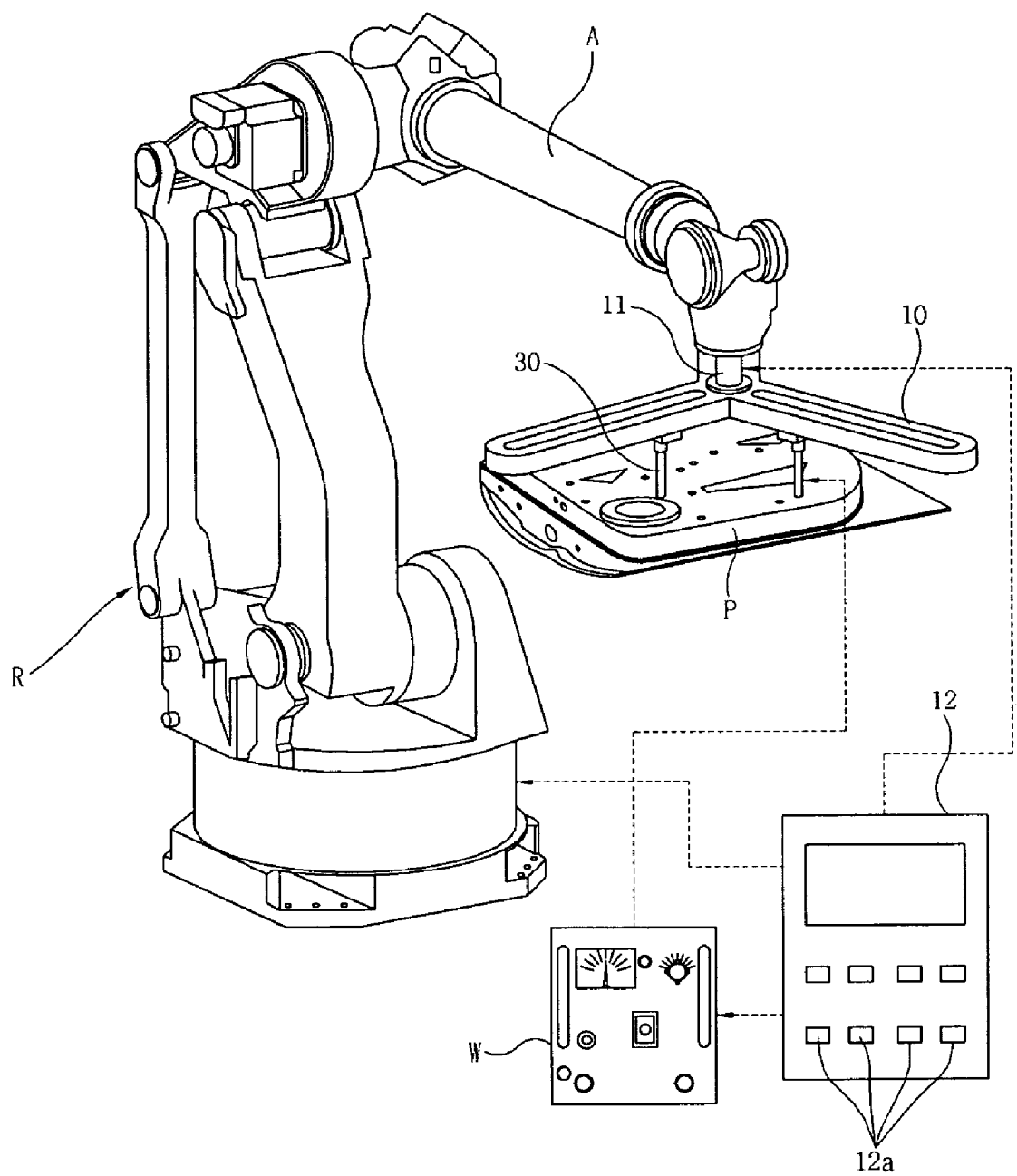
FIG. 1 is a view illustrating the use of a jig for gripping a panel, according to an embodiment of the present invention.
Figure 2:
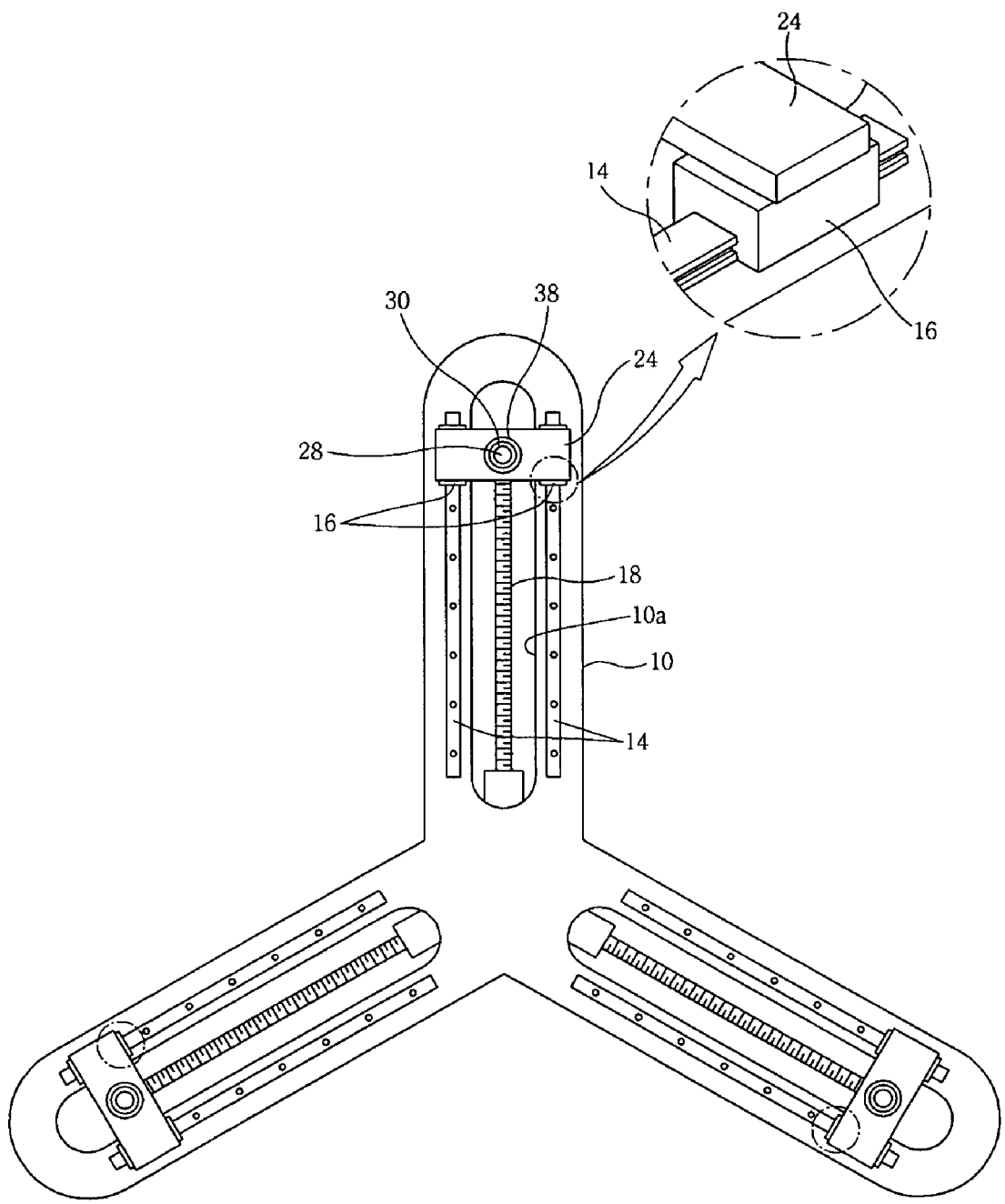
FIG. 2 is a view illustrating the construction of the panel gripping jig, according to an embodiment of the present invention.
Figure 3:
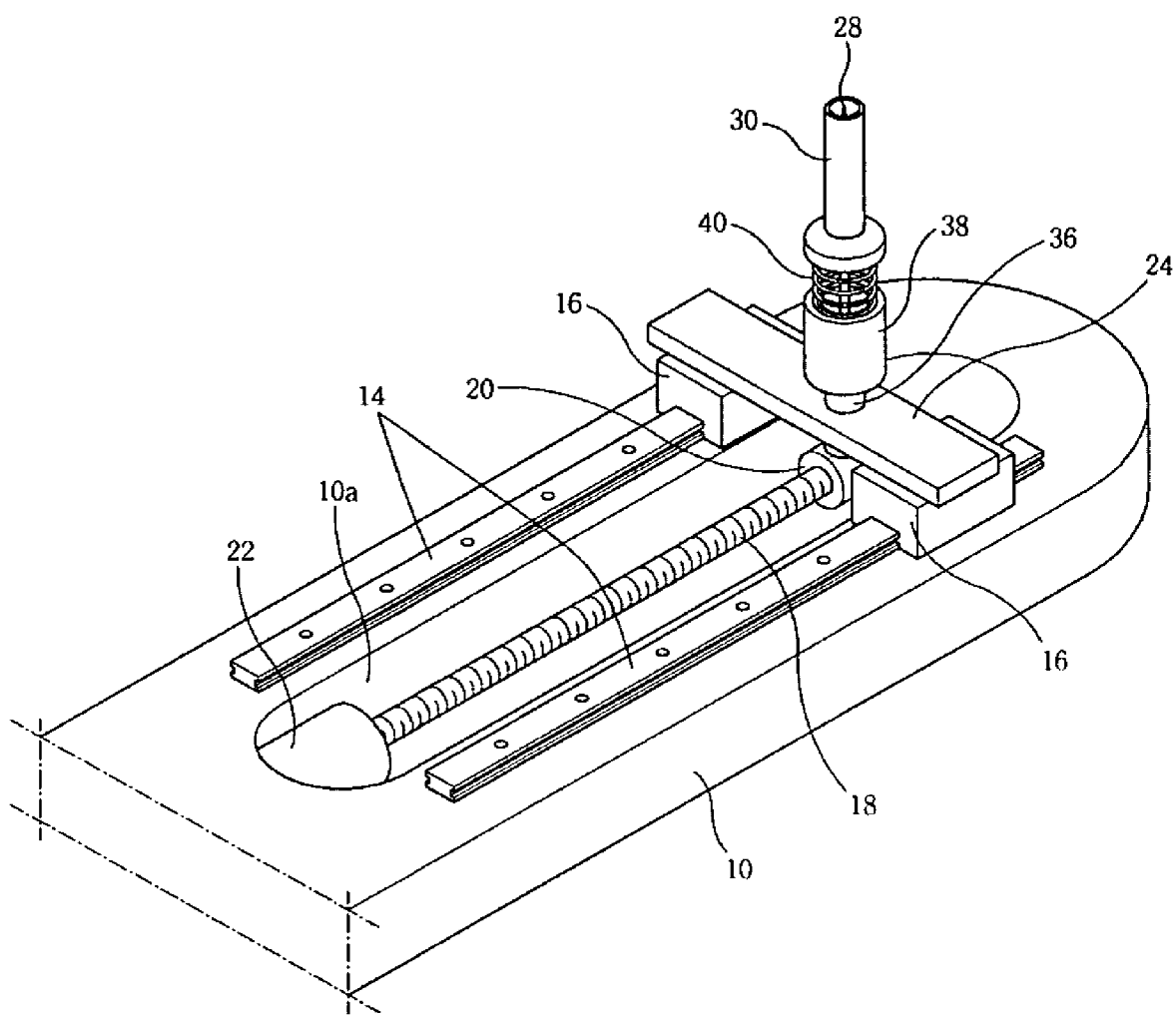
FIG. 3 is an enlarged view of part of FIG. 2.
Figure 4:
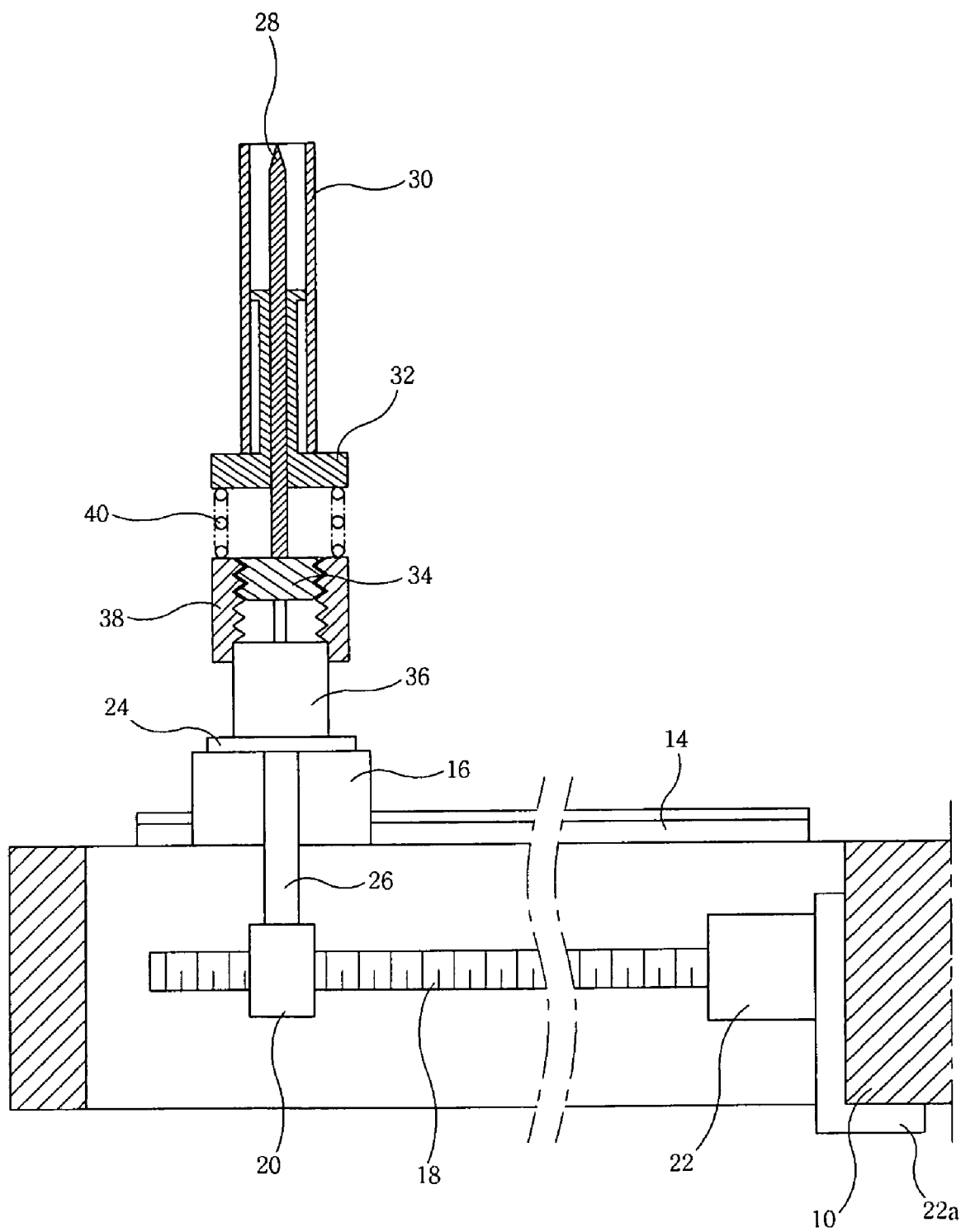
FIG. 4 is a vertical sectional view of FIG. 3.

Embodiments of the present invention provide a panel gripping jig including a welding unit, a separation unit, a mounting arm 10, a displacement unit, and a control unit, such as a control board 12. The welding unit may be spot-welded to the surface of a workpiece such as panel P, which may be formed through pressing, and is temporarily joined to the panel P. The separation unit separates the panel P from the welding unit at a desired time. The welding unit is mounted to the mounting arm 10 to move in a longitudinal direction thereof. The mounting arm 10 has a connection part 11 which is connected to a working robot R. The displacement unit variably adjusts the position of the welding unit on the mounting arm 10. The control board 12 outputs control signals to operate the welding unit, the separation unit, and the displacement unit according to operating instructions.

The control board 12 may be provided with keys 12a for inputting the operating instructions. In response to the operating instructions input through the keys 12a, the operation of the welding unit, the separation unit, and the displacement unit are independently controlled.

Further, the welding unit is electrically connected to a welding machine W. Conducting wires (not shown) provided between the welding unit and the welding machine W are arranged so as to prevent interference within the working range of the working robot R.

The mounting arm 10 may be a plurality of arms which are branched radially from the connection part 11.

The displacement unit may include linear motion guide rails 14, linear motion blocks 16, and drive units. The linear motion guide rails 14 are installed in the longitudinal direction of each mounting arm 10. The linear motion blocks 16 are movably coupled to corresponding linear motion guide rails 14. Each drive unit provides moving force to the linear motion blocks 16.

Each drive unit may include a ball screw 18, a ball nut 20, and a first motor 22. The ball screw 18 is installed in the longitudinal direction of each mounting arm 10. The ball nut 20 engages with the ball screw 18, and is coupled to the linear motion blocks 16. The first motor 22, comprising a step motor, provides rotating force to the ball screw 18, so that the ball nut 20 moves with respect to the ball screw 18. The first motor 22 is mounted to each mounting arm 10 via a bracket 22a.

Each mounting arm 10 has a guide slot 10a which is formed along the center of the arm 10 to extend along a substantial portion of the length of the mounting arm 10. A pair of linear motion guide rails 14 is provided on opposite sides of the guide slot 10a. The linear motion blocks 16 are coupled to respective linear motion guide rails 14. The pair of linear motion blocks 16 is coupled to each other via a plate 24 which is mounted on the upper portions of the linear motion blocks 16. The plate 24 is coupled to the ball nut 20 via a coupling rod 26 which is provided on the bottom of the plate 24.

The welding unit includes a pole 28, a hollow ground tube 30, and a hollow bushing 32. The pole 28 is electrically connected to the welding machine W, and melts an objective material to thus adhere to the material. The hollow ground tube 30 is installed outside the pole 28, and is electrically grounded. The bushing 32 electrically insulates the pole 28 from the ground tube 30 and supports an end of the ground tube 30, with the pole 28 passing through the bushing 32.

The separation unit includes a movable block 34, a second motor 36, and a fixed block 38. The movable block 34 is an electrically insulating rotary body which is coupled to an end of the pole 28 and has a threaded part on an outer circumferential surface thereof. The second motor 36 provides rotating force to the movable block 34, and is supported by the linear motion block 16. The hollow fixed block 38 has a threaded part on an inner circumferential surface thereof that engages with the movable block 34, and is coupled to the second motor 36.

A return spring 40, made of a shock absorbing material, is installed between the hollow bushing 32 and the fixed block 38.

The operation of the panel gripping jig according to an embodiment of the present invention will be described in detail below.

The mounting arms 10, connected to an arm A of the working robot R via the connection part 11, grip the surface of the panel P through spot welding, using the welding units which are movably installed along the corresponding linear motion guide rails 14.

Each first motor 22 operates the ball screw 18 according to the size and shape of the panel P, thus adjusting the position of the ball nut 20. Thereby, the position of the linear motion blocks 16 relative to the linear motion guide rails 14 is adjusted.

Further, when the panel P is spot welded, the return spring 40 absorbs shocks generated when the surface of the panel P comes into contact with the pole 28.

Moreover, each of the hollow bushing 32 and the movable block 34 comprises an electric insulator, thus, when the panel P is spot welded, electric current applied to the pole 28 is prevented from being transmitted through the mounting arm 10 to the working robot R during the welding operation.

Subsequently, as the working robot R is operated, the panel P gripped by each welding unit is carried to the loading process. After the panel P has been carried, the panel P is separated from the welding unit by the operation of each separation unit, and is loaded into its proper place.

In such a process, the second motor 36 rotates the movable block 34 so that the movable block 34 enters the fixed block 38. At this time, the pole 28 secured to the movable block 34 moves into the ground tube 30. Thereby, the end of the pole 28 secured to the panel P through spot welding is separated from the panel P.

Subsequently, the second motor 36 moves the movable block 34 to its original position in the fixed block 38 to prepare for the task of gripping a subsequent panel P.

Meanwhile, in a series of working processes, the operation of the welding units, the separation units, and the displacement units is performed in response to a worker's instructions which are input through the manipulation keys 12a provided on the control board 12.

Further, the spot welding marks remaining on the surface of the panel P do not affect the appearance of the vehicle body, because the panel is not used as an external panel defining the skin of the vehicle body, but is mainly used as a reinforcing panel for increasing structural strength.

As apparent from the foregoing, there is an advantage in the present invention in that a panel gripping jig for gripping various kinds of panels is capable of variably adjusting the position of a gripping part according to the size and shape of panels, and is capable of firmly holding a panel through spot welding regardless of the degree of curvature of the surface of the panel, thus being universally utilized for gripping the panel when the panel is carried by a working robot.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A jig for gripping a workpiece, comprising:
   a welding unit for temporarily holding the workpiece;
   a separation unit for releasing a coupling state of the workpiece and the welding unit;
   at least one mounting arm for moving the welding unit in a longitudinal direction of the at least one mounting arm, and comprising a connection part to connect the at least one mounting arm to a robot;
   a displacement unit for adjusting a position of the welding unit on the at least one mounting arm; and
   a control unit for outputting control signals to operate the welding unit, the separation unit, and the displacement unit according to a user input, wherein the at least one mounting arm comprises a plurality of mounting arms which are branched radially from the connection part.

2. The jig as defined in claim 1, wherein the displacement unit comprises:
   a linear motion guide rail disposed along the longitudinal direction of the at least one mounting arm;
   a linear motion block movably coupled to the linear motion guide rail; and
   a drive unit for moving the linear motion block.

3. The jig as defined in claim 2, wherein the drive unit comprises:
   a ball screw disposed along the longitudinal direction of the at least one mounting arm;
   a ball nut engaging with the ball screw, and coupled to the linear motion block; and
   a first motor for rotating the ball screw.

4. The jig as defined in claim 3, wherein the at least one mounting arm comprises a guide slot disposed along the longitudinal direction of the at least one mounting arm, the linear motion guide rail comprises a pair of linear motion guide rails which are provided on opposite sides of the guide slot, and the linear motion block comprises a pair of linear motion blocks which are coupled to corresponding ones of the linear motion guide rails, the pair of linear motion blocks being coupled to each other via a plate, the plate being coupled to the ball nut via a coupling rod.

5. The jig as defined in claim 3, wherein the welding unit comprises:
   a pole electrically connected to a welding machine;
   a hollow ground tube mounted outside the pole and electrically grounded; and
   a hollow bushing comprising an insulator to insulate the pole from the ground tube, and supporting an end of the ground tube, the pole passing through the hollow bushing.

6. The jig as defined in claim 5, wherein the separation unit comprises:
   a movable block comprising a threaded part and an insulator, with an end of the pole being mounted to the movable block;

a second motor for rotating the movable block, and supported by the linear motion block; and
a hollow fixed block comprising a threaded part to engage with the threaded part of the movable block, and coupled to the second motor.

7. The jig as defined in claim 6, further comprising a return spring between the hollow bushing and the fixed block.

* * * * *